United States Patent
Raghavan et al.

(10) Patent No.: US 10,803,045 B2
(45) Date of Patent: Oct. 13, 2020

(54) SYSTEMS AND METHODS FOR MULTILINGUAL METADATA

(71) Applicant: Open Text SA ULC, Halifax (CA)

(72) Inventors: Srikanth Raghavan, Ashburn, VA (US); Richard Guildford Hellier, Jr., Catawba, VA (US); Kathy DiBella, Milford, NH (US); Michael Scott, Washington Grove, MD (US); Andrew Chillrud, Saratoga Springs, NY (US)

(73) Assignee: Open Text SA ULC, Halifax (CA)

( * ) Notice: Subject to any disclaimer, the term of this patent is extended or adjusted under 35 U.S.C. 154(b) by 184 days.

(21) Appl. No.: 15/365,262

(22) Filed: Nov. 30, 2016

(65) Prior Publication Data
US 2017/0154101 A1    Jun. 1, 2017

Related U.S. Application Data

(60) Provisional application No. 62/261,162, filed on Nov. 30, 2015.

(51) Int. Cl.
*G06F 16/23* (2019.01)
*G06F 3/0486* (2013.01)
(Continued)

(52) U.S. Cl.
CPC ........ *G06F 16/2343* (2019.01); *G06F 3/0482* (2013.01); *G06F 3/0486* (2013.01);
(Continued)

(58) Field of Classification Search
CPC ........... G06F 17/30362; G06F 17/3023; G06F 17/245; G06F 17/30292; G06F 3/04847;
(Continued)

(56) References Cited

U.S. PATENT DOCUMENTS

| 7,373,341 B2* | 5/2008 | Polo-Malouvier .... G06F 16/248 |
| 8,504,534 B1* | 8/2013 | Tendick .............. G06F 17/2264 707/694 |

(Continued)

OTHER PUBLICATIONS

Office Action issued for U.S. Appl. No. 15/096,926, dated Nov. 16, 2017, 18 pages.
(Continued)

*Primary Examiner* — Aleksandr Kerzhner
*Assistant Examiner* — Maher N Algibhah
(74) *Attorney, Agent, or Firm* — Sprinkle IP Law Group

(57) ABSTRACT

A content management system provides a mechanism for representing a particular piece of metadata in multiple languages. The multilingual metadata system provides a user with an ability to visualize a single translation in a language of the user's preference or based on the user's locale. The system receives an indication that at least one metadata field associated with a managed object contains multilingual metadata. A locale metadata table and a new metadata table for the managed object are created using information from an original metadata table for the managed object. Two or more metadata field values representing at least two languages are received by the system. The metadata fields are tagged with locale information and stored in the locale metadata table in association with the at least one metadata field in the new metadata table.

14 Claims, 13 Drawing Sheets

(51) Int. Cl.
- *G06F 16/22* (2019.01)
- *G06F 16/25* (2019.01)
- *G06F 16/21* (2019.01)
- *G06F 16/33* (2019.01)
- *G06F 16/18* (2019.01)
- *G06F 40/58* (2020.01)
- *G06F 40/177* (2020.01)
- *G06F 3/0482* (2013.01)
- *G06F 3/0484* (2013.01)
- *H04L 29/06* (2006.01)

(52) U.S. Cl.
CPC ...... *G06F 3/04847* (2013.01); *G06F 16/1873* (2019.01); *G06F 16/211* (2019.01); *G06F 16/219* (2019.01); *G06F 16/22* (2019.01); *G06F 16/2329* (2019.01); *G06F 16/25* (2019.01); *G06F 16/3337* (2019.01); *G06F 40/177* (2020.01); *G06F 40/58* (2020.01); *H04L 63/08* (2013.01)

(58) Field of Classification Search
CPC ............. G06F 17/30312; G06F 3/0482; G06F 17/30669; G06F 17/289; G06F 17/30557; G06F 17/30309; G06F 17/30356; G06F 3/0486; H04L 63/08; H04L 67/42
See application file for complete search history.

(56) References Cited

U.S. PATENT DOCUMENTS

| | | | |
|---|---|---|---|
| 9,348,890 B2 | 5/2016 | Larson | |
| 10,073,875 B2 | 9/2018 | Larson | |
| 2005/0004933 A1* | 1/2005 | Potter | G06F 9/454 |
| 2005/0050548 A1* | 3/2005 | Sheinis | G06F 9/4488 |
| | | | 719/311 |
| 2006/0031263 A1 | 2/2006 | Arrouye et al. | |
| 2008/0065699 A1 | 3/2008 | Bloebaum et al. | |
| 2008/0270462 A1 | 10/2008 | Thomsen | |
| 2009/0044095 A1* | 2/2009 | Berger | G06F 16/258 |
| | | | 715/226 |
| 2009/0089315 A1 | 4/2009 | Jeffery et al. | |
| 2009/0119255 A1 | 5/2009 | Frank et al. | |
| 2009/0222434 A1 | 9/2009 | Fothergill | |
| 2012/0179702 A1 | 7/2012 | Nozaki et al. | |
| 2012/0290558 A1 | 11/2012 | Gruber | |
| 2013/0166573 A1 | 6/2013 | Vaitheeswaran et al. | |
| 2013/0346444 A1 | 12/2013 | Makkar et al. | |
| 2014/0201187 A1* | 7/2014 | Larson | G06F 17/30398 |
| | | | 707/711 |
| 2014/0244236 A1* | 8/2014 | Johnson, III | G06F 17/289 |
| | | | 704/2 |
| 2016/0224601 A1 | 8/2016 | Larson | |
| 2017/0154101 A1 | 6/2017 | Raghavan et al. | |

OTHER PUBLICATIONS

Office Action issued for U.S. Appl. No. 13/595,570, dated Jan. 3, 2014, 8 pages.

Office Action issued for U.S. Appl. No. 13/595,570, dated Apr. 10, 2014, 8 pages.

Office Action issued for U.S. Appl. No. 13/595,570, dated Sep. 2, 2014, 11 pages.

Office Action issued for U.S. Appl. No. 13/595,570, dated Dec. 8, 2014, 9 pages.

Office Action issued for U.S. Appl. No. 13/595,570, dated Apr. 17, 2015, 9 pages.

Office Action issued for U.S. Appl. No. 13/595,570, dated Aug. 18, 2015, 10 pages.

Office Action issued for U.S. Appl. No. 15/096,926, dated Jan. 13, 2017, 13 pages.

Office Action issued for U.S. Appl. No. 15/096,926, dated May 31, 2017, 9 pages.

Office Action issued for U.S. Appl. No. 16/052,991, dated Jul. 9, 2020, 11 pages.

* cited by examiner

Custom Table Editor

Metadata Tables
- Custom_Table_Name

Tabular Metadata Tables
Lookup Domain Tables
Cascading Mapping Tables
[+] [-]

Metadata Table

Name: Custom_Table_Name
Columns [+] [-]

| Column Name | Datatype | Size | Precision | Nullable | Primary Key | Multilingual |
|---|---|---|---|---|---|---|
| UOI_ID | CHARACTER | 40 | | | ✓ | |
| NAME | CHARACTER | 80 | | ✓ | | ✓ |
| DESCR | CHARACTER | 200 | | | | ✓ |
| ENTRIES | NUMERIC | 5 | | | | |

410

420 — Create Tables    Cancel

Custom Table Editor

Metadata Tables

Lookup Domain Tables

Custom_Lookup_Table

Lookup Domain Table

Name: Custom_Lookup_Table

Columns [+] [-]

| Column Name | Datatype | Size | Precision | Nullable | Primary Key | Multilingual |
|---|---|---|---|---|---|---|
| ID | CHARACTER ▼ | 40 ▲▼ | | | ☑ | |
| VALUE | CHARACTER ▼ | 80 ▲▼ | | ☑ | ☐ | ☑ |
| DESCR | CHARACTER ▼ | 200 ▲▼ | | | ☐ | ☑ |

610 → Multilingual

620 →

Domain Values [+] [-]

| ID | VALUE | DESCR |
|---|---|---|
| 1 | LIBRARY | |
| 2 | TOWN HALL | Government offices |
| 3 | GYM | Recreation facilities |

Locale Filter default (en_US) ▼

French (fr_FR) ☐
German (de_DE) ☐
Japanese (ja_JA) ☑

Cascading Mapping Tables

[+] [-]

[ Update Tables ]   [ Cancel ]

FIG. 6

Custom Table Editor

Metadata Tables

Tabular Metadata Tables

Custom_TMD_Name

---

Metadata Table

Name: Custom_TMD_Name

Columns [+] [−]

| Column Name | Datatype | Size | Precision | Nullable | Primary Key |
|---|---|---|---|---|---|
| UOI_ID | CHARACTER ▼ | 40 ◆ | | ☐ | ☑ |
| NAME | CHARACTER ▼ | 80 ◆ | | ☑ | ☐ |
| DESCR | CHARACTER ▼ | 200 ◆ | | ☐ | ☐ |
| ENTRIES | NUMERIC ▼ | 5 ◆ | | | |

---

Lookup Domain Tables

Cascading Mapping Tables

[+] [−]

[Create Tables]  [Cancel]

Custom Table Editor

Metadata Tables

Tabular Metadata Tables

Custom_TMD_Name

Metadata Table

Name: Custom_TMD_Name

Columns: [+] [−]

| Column Name | Datatype | Size | Precision | Nullable | Primary Key | Multilingual |
|---|---|---|---|---|---|---|
| UOI_ID | CHARACTER ▼ | 40 | | | ☑ | |
| INSTANCE | NUMERIC ▼ | | | | ☐ | |
| NAME | CHARACTER ▼ | 80 | | ☑ | ☐ | ☑ |
| DESCR | CHARACTER ▼ | 200 | | ☐ | ☐ | ☑ |
| ENTRIES | NUMERIC ▼ | 5 | | | | |

910

Lookup Domain Tables

Cascading Mapping Tables

[+] [−]

[ Create Tables ]   [ Cancel ]

SYSTEMS AND METHODS FOR MULTILINGUAL METADATA

CROSS-REFERENCE TO RELATED APPLICATION(S)

This application is a conversion of, and claims a benefit of priority under 35 U.S.C. § 119 from U.S. Provisional Application No. 62/261,162, filed Nov. 30, 2015, entitled "SYSTEMS AND METHODS FOR MULTILINGUAL METADATA, MULTI-FILE CHECK-IN, AND MULTI-BRAND EXPERIENCE," which is hereby fully incorporated by reference herein.

TECHNICAL FIELD

This disclosure relates generally to content management, including digital asset management, multimedia management, etc. More particularly, embodiments disclosed herein relate to systems, methods, and computer program products for new multilingual metadata features useful for content management.

BACKGROUND

Traditional content management systems are widely used to describe objects managed by the content management systems. For example, an image file may have metadata about the image such as a description of the image, the photographer who took the image, etc. A system may be configured to always show such metadata in a particular language. However, the metadata may initially be entered in a different language, requiring a translation ahead of time, or in real-time. A typical content management system may include separate metadata fields for each supported language, resulting in a complicated, non-flexible content management system. For example, a "name" attribute for an object may include multiple attributes, such as "name_english," "name_french," etc. In such a system, the system will not have the intelligence to know that "name_french" is actually in the French language, but rather, is just another field.

SUMMARY

An object of this disclosure is to provide a new mechanism for representing a particular piece of metadata in multiple languages. Today, metadata are widely used to describe objects managed by content management systems. For example, an image file may have metadata about the image such as a description of the image, the photographer who took the image, etc. A system may be configured to always show such metadata in a particular language (e.g., messages, etc. . . . ). However, the metadata may initially be entered in a different language. In some cases, it may be desirable to have multiple languages represented for a particular piece of metadata. In some embodiments, this is realized in a feature function referred to as "multilingual metadata." Following the above example, this multilingual metadata feature function provides a user with an ability to visualize a single translation in a language of the user's preference (e.g., the metadata can be shown in French if the user is French or prefers the French language). Using the exact same system, a German user can view a metadata description of the image in German. In some embodiments, a string containing metadata for a managed object may be internationalized in code. The managed object may be delivered to a requesting user with localization capability embedded in code. That is, localization code is embedded for each field of metadata. In one embodiment, metadata may be represented in multiple languages, if desired. This can be particular useful for power users such as editors, librarians, etc.

Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

FIG. 4 depicts a screenshot representation of an exemplary metadata table editor that allows an administrator/user to create new metadata tables for their environment, according to some embodiments.

FIG. 6 depicts a screenshot representation of an exemplary metadata table editor that allows an administrator/user to create new metadata lookup domain tables for their environment, according to some embodiments.

FIG. 8 depicts a screenshot representation of an exemplary custom table editor page relating to tabular metadata fields, according to some embodiments.

FIG. 9 depicts a screenshot representation of an exemplary custom multilingual tabular metadata table, according to some embodiments.

FIG. 11 depicts a screenshot representation of an exemplary user interface for defining whether a field in a custom metadata table requires multilingual support, according to some embodiments.

FIG. 12A depicts a screenshot representation of an exemplary media management user interface illustrating how an end user may edit multilingual metadata field(s) associated with a managed asset that is enabled with a multilingual metadata feature function, according to some embodiments.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Figure 1:
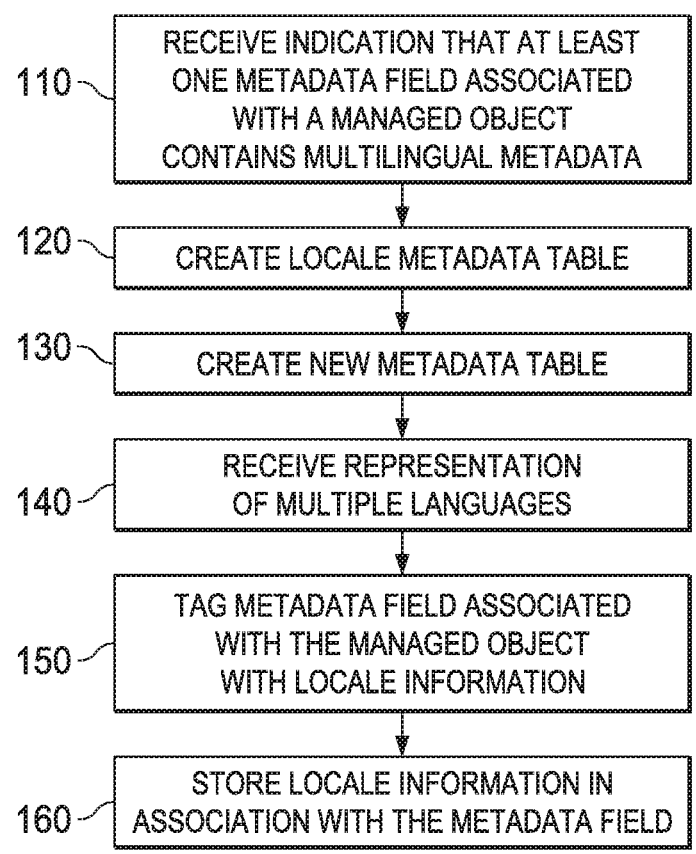
FIG. 1 depicts a flow chart illustrating an exemplary method for managing metadata in a content management system, according to some embodiments.

Generally, embodiments of the present disclosure relate to systems, methods, and computer program products for new multilingual metadata features useful for content management. The disclosure describes a way to provide a new mechanism for representing a particular piece of metadata in multiple languages. In some embodiments, this multilingual metadata feature function provides a user with an ability to visualize a single translation in a language of the user's preference. FIG. 1 (described in detail below) is a flow chart illustrating an example of a method for managing metadata in a content management system. In some embodiments, the method may comprise receiving an indication that at least one metadata field associated with a managed object contains multilingual metadata; creating a locale metadata table; creating a new metadata table for the managed object using information from an original metadata table for the managed object; receiving at least two metadata field values for the at least one metadata field, wherein the at least two metadata field values representing at least two languages; tagging the at least one metadata field with locale information; and storing the locale information in the locale metadata table in association with the at least one metadata field in the new metadata table.

The multilingual metadata systems described below provide several advantages over traditional content management systems. First, the system provides more accurate translations and a higher level of quality and control, compared to traditional translations. Another advantage relates to searching (described below). Improved search results are possible by storing language variants as persistent data that is indexed and searched in their respective language, versus just looking at a translation of a page. Another advantage relates to the ability to see multiple languages from the same field. Another advantage over traditional systems is that information displayed on a user's screen is not just a web page, but rather can be thought of as a form with a tag pointing to a description (or other field) in a desired language. The data can be viewed in any desired language, for example, in English, French, German, etc. The data can also be searched in any of the languages.

Figure 2:
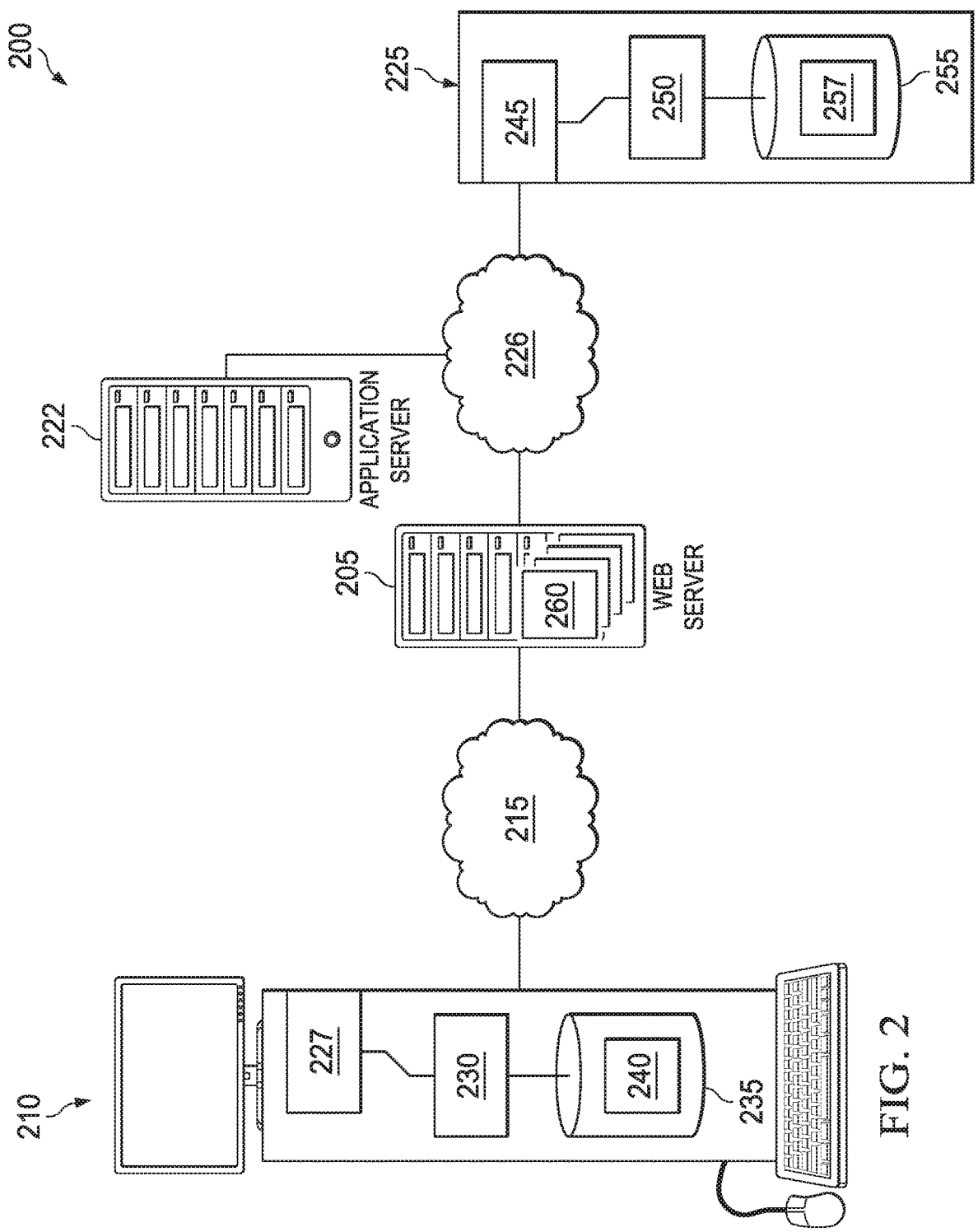
FIG. 2 depicts an exemplary enterprise computing environment where embodiments disclosed herein may be implemented.

FIG. 2 depicts a diagrammatic representation of enterprise computing environment 200 where embodiments disclosed herein may be implemented. In FIG. 2, web server 205 is communicatively connected to client computer 210 via network 215, which can be a global computer network such as the Internet, a local area network (LAN), a wide area network (WAN), a wireless network or any computer network known in the art. Web server 205 can also be communicatively connected to additional servers, such as, for example, application server 222 and content management system (CMS) 225 via, for example, second network 226 (e.g., a LAN).

Client computer 210 can include network interface 227 (e.g., an internal or external modem, Ethernet adapter or other network interface device known in the art) to connect to and interface with network 215, processor 230 and non-transitory computer readable storage medium 235 (e.g., random access memory (RAM), read-only memory (ROM), optical storage medium, magnetic storage medium or any other computer readable memory known in the art). Additionally, client computer 210 can include one or more input devices (e.g., keyboard, mouse, voice activated input or other input device known in the art) and one or more displays. Computer readable storage medium 235 can store browser program 240 that can be executable by processor 230 to allow a user, through the use of the input and display devices, to request and view web pages over network 215. Examples of browser programs include Netscape Navigator™, (Netscape and Netscape Navigator are trademarks of Netscape Communications Corporation of Mountain View, Calif.) and Microsoft Internet Explorer™ (Microsoft and Microsoft Internet Explorer are trademarks of Redmond Wash. based Microsoft Corporation).

Likewise, CMS 225 can include a network interface 245 (e.g., an internal or external modem, Ethernet adapter or other network interface device known in the art) to connect to and interface with network 226, processor 250 and non-transitory computer readable storage medium 255 (e.g., RAM, ROM, optical storage medium, magnetic storage medium or any other computer readable memory known in the art). Computer readable storage medium 255 can store computer instructions 257 executable by processor 250 to perform one or more feature functions disclosed herein.

Although not shown for clarity, each of web server 205 and application server 222 can include computer components such as network interfaces, memories, processors, and other computer components and software known in the art. Web server 205 can host web site 260 that can comprise one or more web pages. A user, via browser program 240, can generate a request, such as an HTTP GET request for a web page hosted by web server 205. Web server 205 can retrieve the web page and communicate the web page to browser 240 for review by a user. Included in the web page can be text, graphics, audio content and video content. Additionally, each of web server 205 and application server 222 can contain software applications that can communicate with CMS 225 at the backend.

An enterprise may use CMS 225 to store, organize, find, retrieve, and share managed objects. Managed objects may include, for example, media files or digital media. Each managed object may have metadata associated therewith that describe the particular managed object. Metadata may include various fields, such as author's name, description of the file, etc. and may be useful in cataloging and searching managed objects. A search application may use the information contained in the metadata of a managed object when searching for managed objects.

Skilled artisans appreciate that CMS 225 is representative of many types of information management systems, including those that provide digital media management. Digital media refers to any media that are encoded in a machine-readable format. Objects managed by CMS 225 can include many types of digital media, for instance, computer programs, text, images, audio, videos, games, web pages, web sites, databases, etc. Digital media can be created, viewed, distributed, modified, and preserved on computers and often have rich metadata associated therewith. For example, an image of a company's product may have metadata such as a product description, a photographer, etc. associated with the image. These descriptions may be comprised of strings of text. A user wishing to search for digital media may initiate a search. A search application may utilize the text strings in the metadata and return search results to the user. Because the metadata may be comprised of strings of text, searches using metadata are limited to the language in which the metadata is written.

Searching for managed objects in CMS 225 may be difficult for users when the language of a search query is different from the metadata language. Differences in language may present difficulties, for example, for global companies wishing to share content. For example, a German section of a company may create a media file, such as an image of the company's logo and may wish to share the image with the rest of the company via the media management product. Metadata for the image may be written in German. A user in the United States wishing to search for images of the company's logo would run a search in English and thus the search may be ineffective due to the language difference.

Figure 10:
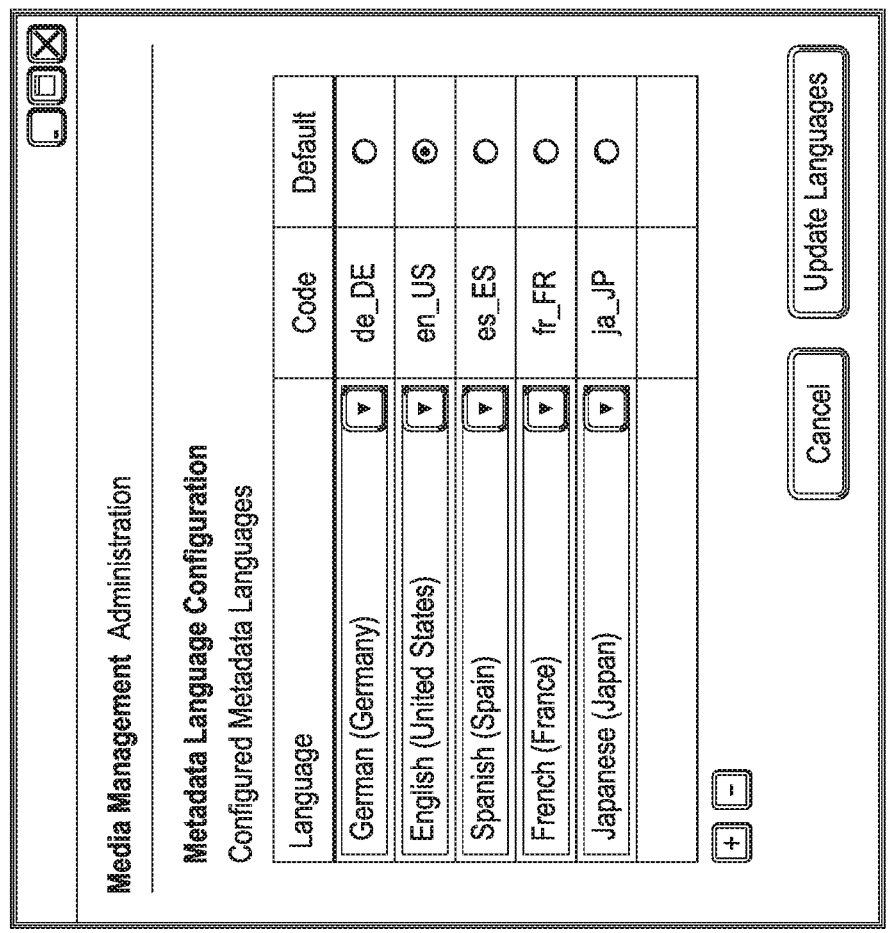
FIG. 10 depicts a screenshot representation of an exemplary metadata language configuration page, according to some embodiments.

As described above, FIG. 1 is a flow chart illustrating an example of a method for managing metadata in a content management system. In some embodiments, the method may begin at step 110 by receiving an indication that at least one metadata field associated with a managed object contains multilingual metadata. In response to such an indication, at step 120, a locale metadata table is created. In some embodiments, an administrator configures the valid locales for the system using a metadata language configuration page in an administrator user interface, an example of which is shown in FIG. 10. The language/locale configuration may be maintained in a database table, which may also specify a default locale for metadata.

Figure 11:
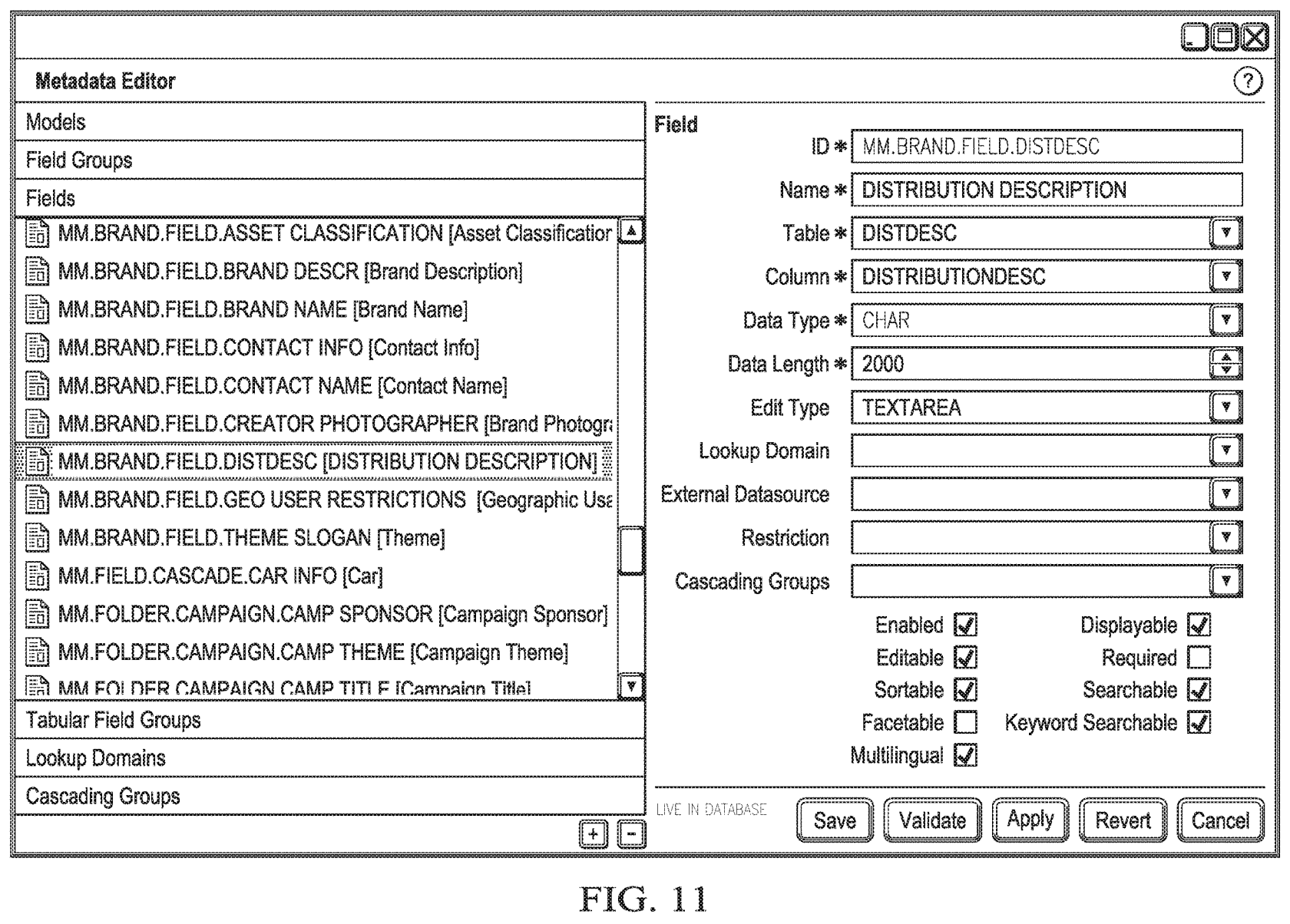

At step 130, a new metadata table is created for the managed object using information from an original metadata table for the managed object. When creating a new custom metadata table, an administrator may specify whether or not each of the fields in the table require multilingual support via a special user interface, an example of which is shown in FIG. 11. In some examples, this option may be provided by a checkbox for each row in the custom metadata table. In some examples, when the metadata table contains one or more multilingual rows, a second multilingual table may be created alongside the main metadata table. The multilingual table may contain the columns marked as multilingual. In some embodiments, a metadata editor page used for defining a new field provides a multilingual option for string (CHAR) fields when the locale metadata table matches the chosen metadata table. As mentioned above, the locale metadata table may provide the opportunity to tag the field as multilingual. In some embodiments, the system will provide all locale (including a default locale) values for a field. For a multilingual metadata field, the value will contain the main (default) values, plus a list of all equivalent translations. Each translation can be tagged with its locale information. At step 140, at least two metadata field values are received for the at least one metadata field, wherein the at least two metadata field values represent at least two languages. At step 150, at least one metadata field with locale information is tagged. At step 160, the locale information in the locale metadata table is stored in association with the at least one metadata field in the new metadata table.

In some embodiments, the method may further comprise receiving a request from a user for metadata information; identifying a preferred language for the user; and if a metadata field description contains metadata in the preferred language, displaying the metadata in the preferred language, otherwise displaying the metadata in a default language. In some embodiments, the method may further comprise receiving location information for the user, wherein the identification of the preferred language for the user is based on the location information received.

Figure 3:
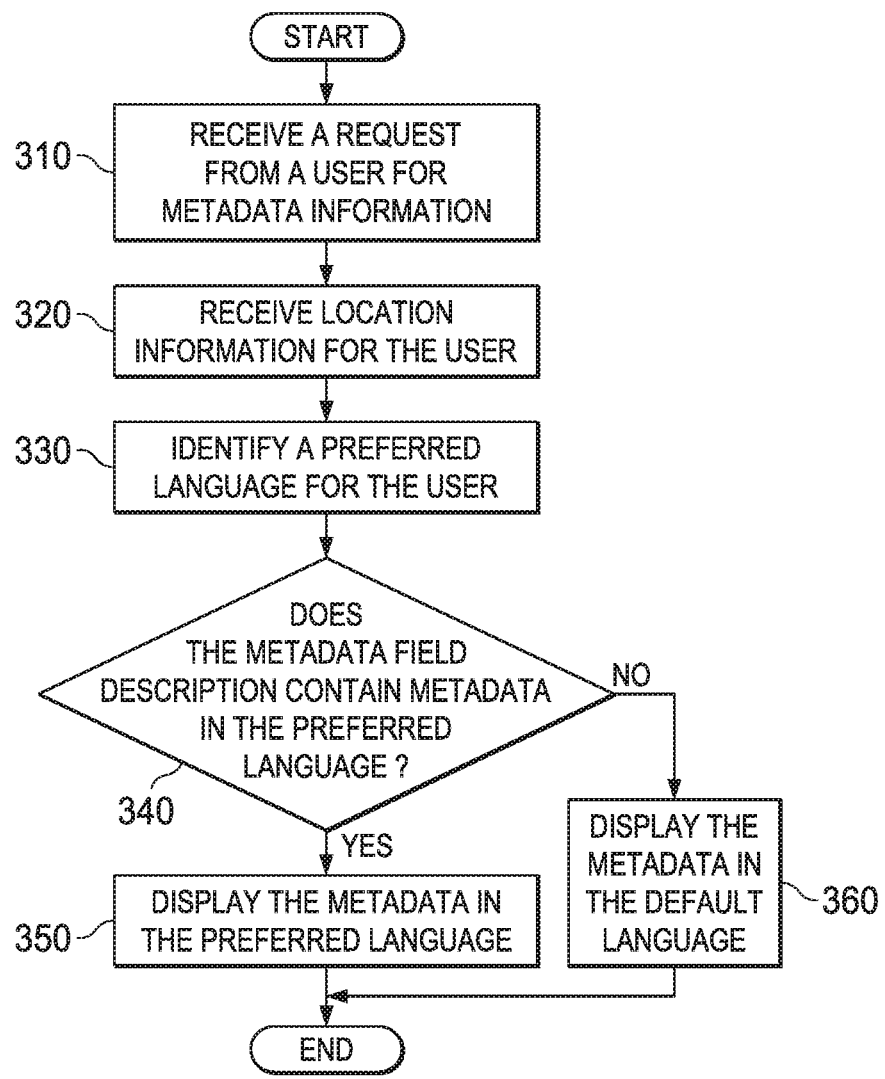
FIG. 3 depicts a flow chart illustrating an example of a method for managing metadata upon a request for metadata information from a user, according to some embodiments.

FIG. 3 depicts a flow chart illustrating an example of a method for managing metadata upon a request from a user for metadata information. The process shown in FIG. 3 may begin at step 310 when a request for metadata information is received from a user (for example, from client computer 210 shown in FIG. 2). At step 320, location information is received for the user. The location information may be received in any desired manner, as one skilled in the art would understand. At step 330, a preferred language is identified for the user. The preferred language can be identified in any desired manner, for example, based on the received location information of the user. At step 340, the process determines whether the metadata field description contains metadata in the preferred language identified in step 330. If the metadata field description contains metadata in the preferred language, the process proceeds to step 350, where the metadata is displayed to the user in the preferred language. If the metadata field description does not contain metadata in the preferred language, the process proceeds to step 360, where the metadata is displayed to the user in a default language.

The multilingual metadata feature function disclosed herein can provide a user with an ability to visualize a single translation in a language preferred by the user. For example, a French user might select "French" as a preferred language while a German user might select "German" as a preferred language. The French user would be shown metadata in French while the German user using the exact same system would be shown metadata in German.

Figure 12A:
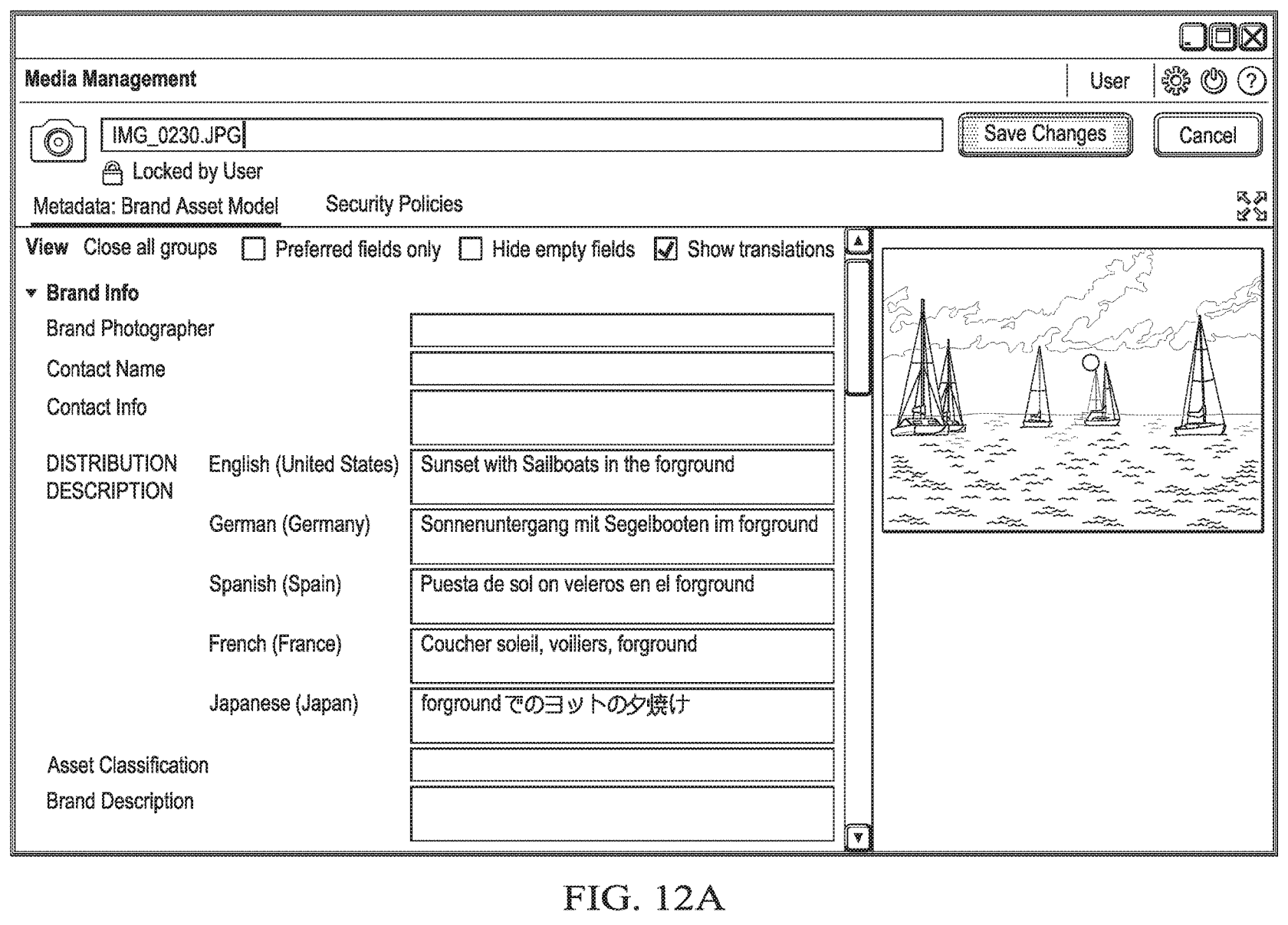
Figure 12B:
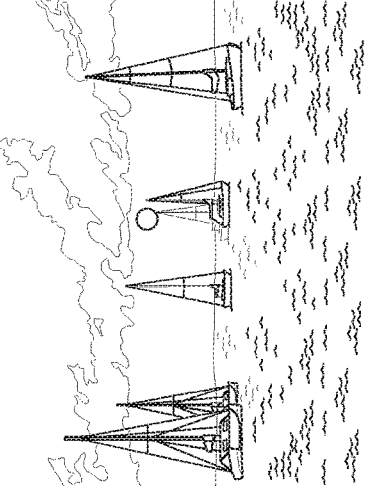
FIG. 12B depicts a screenshot representation of an exemplary media management user interface illustrating an example view of multilingual metadata fields associated with the example managed asset of FIG. 12A and editable via an edit function accessible via the user interface, according to some embodiments.

In some embodiments, the multilingual metadata feature function may be configurable by an administrator to enable multilingual support for specific fields of metadata. All types of metadata fields such as tabular, drop downs, type aheads, inherited metadata, etc., may be supported. Configuration of the metadata fields may be done using REST API and persisted. Configuration of the metadata fields may be exposed to end users through a user interface (see, e.g., FIGS. 12A and 12B). In some embodiments, the multilingual metadata feature can be provided for custom metadata fields. In some embodiments, the multilingual metadata feature is not required for out-of-the-box multimedia management metadata fields.

In some embodiments, the multilingual metadata feature function may include three elements: (1) an element of database storage for storing the content and/or metadata, (2) an element of end User Interface (UI) for displaying the proper locale based on end user preferences, and (3) an element of search that ensures that the search is inclusive of all language variants.

When an administrator enables multilingual metadata for a given object, for example, by enabling a multilingual attribute check box indicating that the metadata field is capable of supporting multiple languages, the backend database storage element or component may create the proper structures in the backend to store the information. In other words, the system enables the administrator to indicate, in a particular attribute, that a metadata field is multilingual. The proper structures may include a locale metadata table and a new metadata table. The new metadata table may be created using some or all of the information from the object's original metadata table.

At the backend, the system may implement an extensible metadata schema where users may define attributes for the object associated with the metadata. For example, a user may specify the need for a product description, market segment, photographer, etc. The system receives these selections from the user and adds the selections to the metadata associated with the object by, for example, adding the attributes to the metadata table.

In defining attributes for a managed object, a user may input a metadata field value and a metadata field value language into the system. The managed object may be associated with a unique identifier. The system may use the unique identifier in adding locale information for each value that is being added in association with the managed object. The system may receive the metadata field value and/or language and store the information in a data store accessible by the system. In some embodiments, the metadata information is stored in a relational table at a backend server machine. In some embodiments, a metadata value may include its default value and all equivalent translations.

One method of implementing the multilingual metadata feature function is using XML. Another method of implementing the multilingual metadata feature function is through the use of language tags in a relational database system.

A user may have one or more preferred languages to be displayed by the system. The preferred language(s) may be defined by the user or an administrator. The preferred language(s) may be set based on a detection of the user's location, company affiliation, group affiliation, or any other method known to those skilled in the art. The system may receive the selection of the preferred language(s) from the user or administrator. The system may also be configured to automatically set a user's preferred language(s) based on the above criteria.

According to one embodiment, similar to the embodiment described above with respect to FIG. 3, when a user requests display of the metadata, the system is operable to recognize the locale of the user and attempt to present metadata in the user's preferred language. The system may use language already entered into the metadata and therefore does not have to translate the metadata on-the-fly. Logic in the user interface may automatically switch the description to the language understood by the user. If the metadata is not available in the user's preferred language, then the system may present metadata based on a default locale. The default locale may be set for a user by the user or an administrator or may be set automatically by the system, such as by detection of the locale of the system where it is installed, by the locale of purchase of the system, or any other means known in the art.

According to one embodiment, a user may view metadata represented in all available languages. A user may enable all languages by selecting an option via a user interface of the system. The system receives the selection via the user interface and, in response, displays metadata to the user in all available languages.

Embodiments of a multilingual metadata system may be implemented in any desired manner, as one skilled in the art would understand. In some embodiments, an implementation may address several goals. One goal may be to define relational database management system changes that may be desired to support the multilingual metadata system. Similarly, one goal may be to define server-side changes desired to support the multilingual metadata system. Another goal may be to define software development kit (SDK) and REST API changes desired to support the multilingual metadata system.

In some embodiments, support for multilingual metadata may entail changes to the relational database tables and the hibernate code used to retrieve the metadata values. Following are descriptions of possible changes used for scalar, domained, and tabular metadata fields.

FIG. 4 depicts a screenshot representation of an exemplary metadata table editor 400 that allows an administrator/user to create new metadata tables for their environment, for example, to accomplish step 130 in the process depicted in FIG. 1. In the example of a scaler metadata table, tables are created by adding a new 'metadata table' table. In this example, support for multilingual metadata will be provided by a parallel (ancillary) locale metadata table that allows the storage the language variant values for alternative languages.

The metadata table editor shown in FIG. 4 enables the addition of a new multilingual column 410 in the displayed table. The multilingual column 410 includes a checkbox that can be selected or unselected by an administrator. The state of the checkbox provides an indication of whether the respective object contains multilingual metadata. In one example, the default value for the checkbox is grayed out and unchecked. In some embodiments, for a datatype of CHARACTER, the multilingual column can be enabled. In the example shown in FIG. 4, columns NAME and DESCR include a multilingual checkbox, which can be selected by a user, if desired.

When one or more columns are configured to be multilingual by a user checking a respective checkbox in column 410 of the table editor 400, a second, parallel multilingual metadata table (a locale metadata table) will be created. In the example shown in FIG. 4, the new locale metadata table is not visible in the custom table editor. In some embodiments, the new multilingual metadata table will be created using all character value columns from the original metadata table.

In some embodiments, when a user clicks the "Create Tables" button 420, several things will happen. First, the main new metadata table will be created (e.g., see step 130 of FIG. 1), and given a custom name. Also, the parallel locale metadata table will be created (e.g., see step 120 of FIG. 1) and given a custom name.

Figure 5:
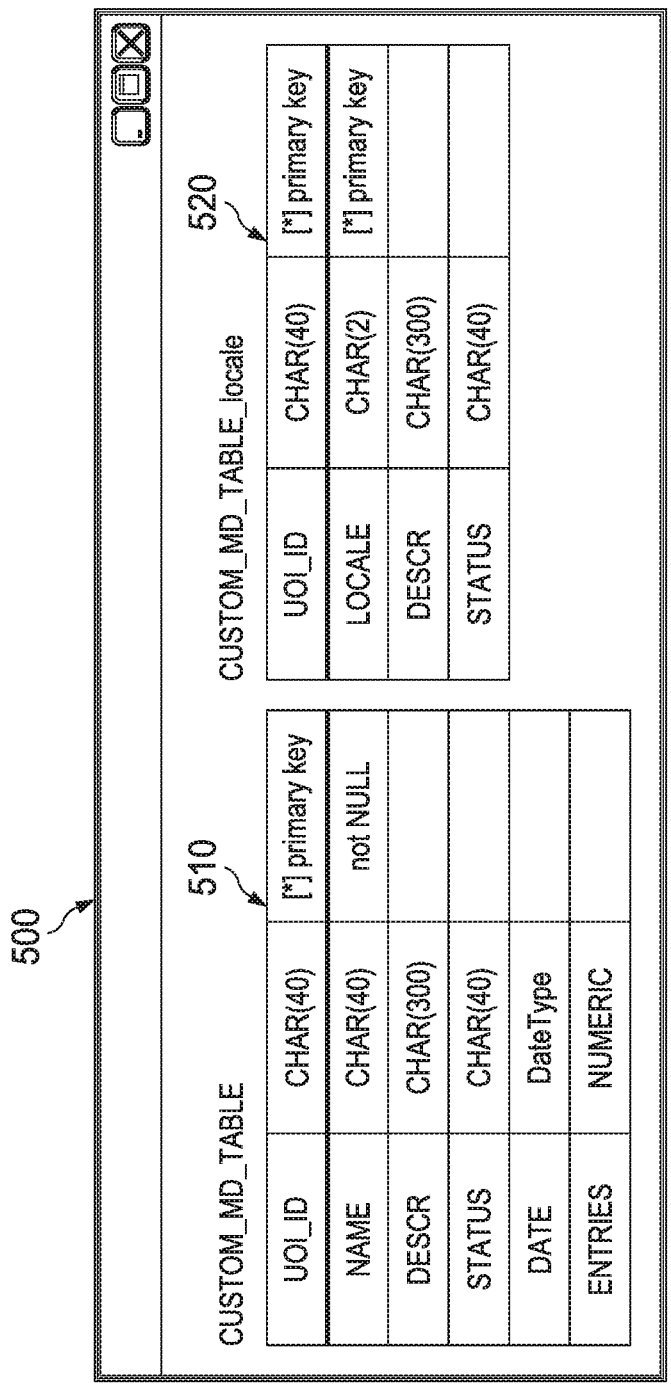
FIG. 5 depicts a screenshot representation showing portions of a custom metadata table and a parallel locale metadata table, according to some embodiments.

FIG. 5 depicts a screenshot representation 500 showing portions of the new custom metadata table 510 and the new parallel locale metadata table 520. In this example, the locale metadata table 520 includes a column UOI_ID, which is the master identifier (unique object identifier) for the respective object and a column LOCALE, which is a valid locale key. The parallel locale metadata table 520 includes the text columns from the main metadata table that are marked as multilingual.

Figure 7:
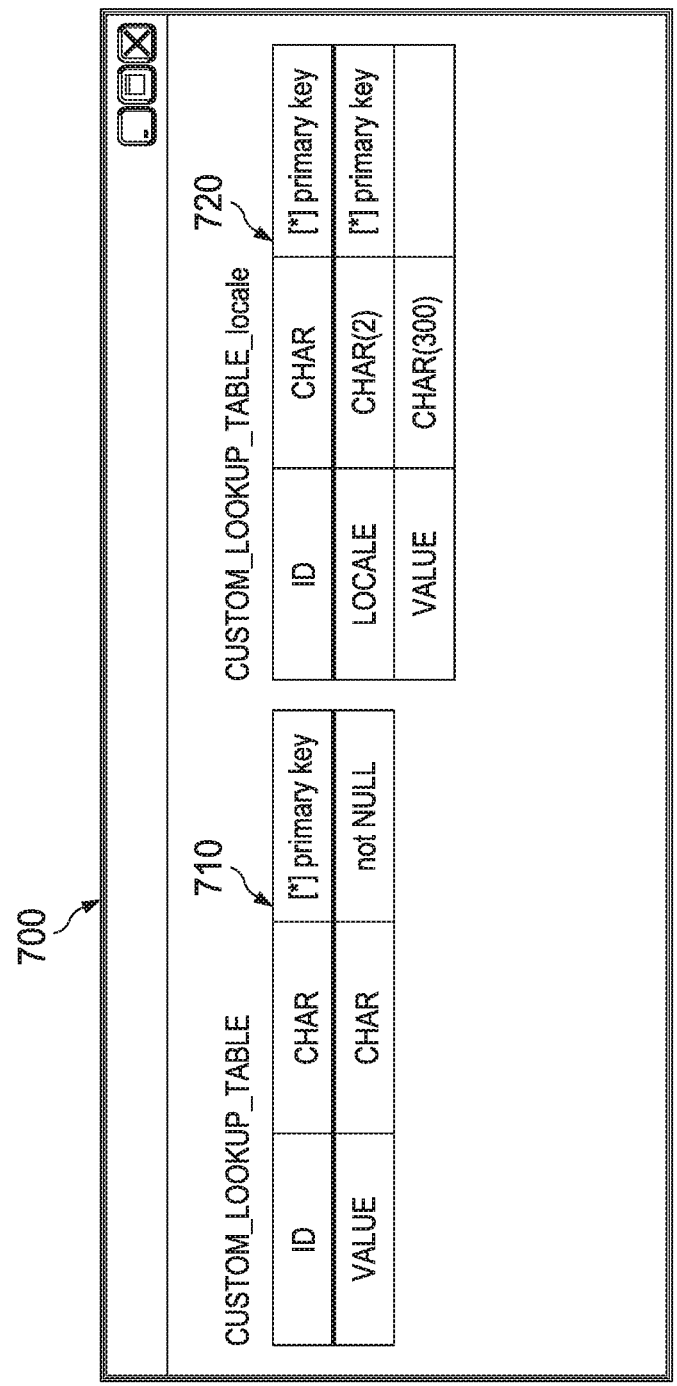
FIG. 7 depicts a screenshot representation showing portions of a custom metadata table and a parallel locale lookup table, according to some embodiments.

FIGS. 6 and 7 depict screenshot representations similar to those shown in FIGS. 4 and 5, but relating to domained metadata fields, rather than scalar metadata fields. FIG. 6 is a screenshot 600 of an exemplary metadata table editor that allows an administrator/user to create new metadata lookup domain tables for their environment, for example, to accomplish step 130 in the process depicted in FIG. 1. In the example of a domained lookup table, tables are created by adding a new 'domain lookup table' table. In this example, support for multilingual metadata will be provided by a parallel locale lookup table.

As with scaler metadata, multilingual metadata support will be provided by a parallel multilingual metadata table. The metadata table editor 600 shown in FIG. 6 enables the addition of a new multilingual column 610 in the displayed table. The multilingual column 610 includes a checkbox that can be selected or unselected by an administrator. In one example, the default value for the checkbox is grayed out and unchecked. In some embodiments, for a datatype of CHARACTER, the multilingual column can be enabled. In the example shown in FIG. 6, columns VALUE and DESCR include a multilingual checkbox, which can be selected by a user, if desired.

When one or more columns are configured to be multilingual by a user checking a respective checkbox in column 610 of the table editor 600, a second, parallel domain multilingual values table will be created. In the example shown in FIG. 6, the new domain multilingual values table is not visible in the custom table editor. In some embodiments, the new domain multilingual values table may contain the columns CODE (or ID), LOCALE and a column for each multilingual checkbox. An administrator/user will be able to select a language and edit the display values for the selected locale. In some examples, a drop-down list of locales is generated from the locale table.

In some embodiments, when the lookup domain table is created, two tables are actually created—the custom lookup table and the custom locale lookup table. In some examples, a new drop-down locale filter list 620 is added to the table editor page to streamline editing locale-specific entries. In these examples, when a specific locale is selected, only the rows from the lookup table pertaining to that locale are displayed.

FIG. 7 depicts a screenshot representation 700 showing portions of the new custom lookup table 710 and the new parallel custom locale lookup table 720. Similar to the Scalar metadata implementation, multilingual translations for domain metadata values are stored in the parallel table.

In this example, the locale lookup table 720 includes column ID: CHAR: which is domain code to be expanded. The column name matches the main table primary key column. The value is contained in the main table primary key column. Another column LOCALE: CHAR (2): is a valid locale key. In addition, the parallel table 720 contains the value column(s) required from the main domain expansion table.

FIGS. 8 and 9 depict screenshot representations similar to those shown in FIGS. 4 and 6, but relating to tabular metadata fields, rather than scalar or domained metadata fields. In some embodiments, the custom table editor page 800 (which is similar to those shown in FIGS. 4 and 6) may include an option to add a new tabular metadata table. FIG. 8 depicts a screenshot representation 800 of an exemplary custom table editor page that includes a button labeled "Tabular Metadata Tables". FIG. 9 depicts a screenshot representation 900 of an exemplary custom multilingual tabular metadata table.

For tabular metadata fields, a new INSTANCE row will be added to the metadata table (shown as the second row in FIG. 9). For multilingual metadata, a new multilingual column will be added to the multilingual metadata table. As shown in FIG. 9, a multilingual column 910 includes checkboxes that can be selected or unselected by an administrator/user. In one example, the default value for the checkbox is grayed out and unchecked. In a tabular metadata table, there may be several rows of data for a single asset. The INSTANCE row is used to map the rows in the main table to the translations in the locale table. As with scalar metadata table, when the "Create Tables" button is selected, the custom tabular metadata table is created. Also, the custom tabular metadata locale table is created.

As described above, embodiments disclosed herein relate to systems, methods, and computer program products for new multilingual metadata features useful for content management. One feature and advantage of the systems, methods, and computer program products described herein relates to searching multilingual metadata. Generally, a field is made both searchable and multilingual and separate indexes are created for the different language variants and can be searched independently.

When a multilingual content management system is used with an off-the-shelf search platform, modifications may be needed to make the multilingual content management system compatible with the off-the-shelf search platform. Such modifications could be accomplished in many ways, as one skilled in the art would understand. Following are some guidelines for some exemplary modifications. Generally, when an asset is added or updated in the system, the system keeps track of what asset ID's have been modified, and an indexer program processes the asset, with all of the metadata values, including the multilingual values, and maps the fields to fields that are compatible with the particular search platform being used. As a result, additional fields (for the search platform being used) are created for each of the language variants. In some embodiments, a configuration file for the search platform defines what fields are expected. As a result, separate fields are automatically created in the search platform for each language variant. In addition, the configuration file includes information indicating whether a particular field is a date, text, number, etc. In some embodiments, the information is extended to also indicate whether the field is a multilingual text field. If a field is tagged as being multilingual, then the system looks for all of the translations and creates a field with the appropriate syntax and sends it to the search platform to be indexed.

On the user searching side, if a user generates a search against a specific metadata field, the system checks to see if the field is a multilingual field, and if so, what language(s) the user wants to search. Then, the search query is modified appropriately before being sent to the search platform.

The concepts relating to searching multilingual metadata will be described in the context of one exemplary search platform, namely, Apache Solr, an open source enterprise search platform. The concepts apply to other search platforms as well, as one skilled in the art would understand. There are several main approaches to indexing multilingual metadata in Solr, some of which are discussed below.

There are several Solr indexing options. One indexing option is one Solr field per locale. In this scenario, all data in a field is one language. In this example, the Solr schema is updated to include a separate field for each language version of a field. For example, for a multilingual field "brand", fields "brand_en" (English), "brand_fr" (French), "brand_de" (German), etc., can be used. Appropriate tokenizing and data processing rules are attached to each field, for example, English rules for brand_en, French rules for brand_fr, etc. Searches against French data would specify the _fr fields in the query, for example.

Another Solr indexing option uses multiple cores, one for each locale. A typical media management system uses a single media management core in its Solr index. In this scenario, a new Solr core will be added for each locale used, for example, mm_en, mm_fr, mm_de, etc.

In some embodiments, each core will be configured with the tools necessary to properly process that language's data. In some examples, each core contains only one language to guarantee the best searching and indexing results. The Indexer may be updated to distribute the asset metadata to the appropriate core.

In some embodiments, the search plugin can be updated to collect all Solr search results and merge them into a single result list. For example, assume part of a user's query is in French. The whole non-French query can be sent to the default Solr core. The French part of the query can be sent to the French core. The results from both cores can be merged to determine the final result list.

In some examples, it is possible to configure Solr so that each core indexes the appropriate multilingual metadata. When that metadata is not available, the default data is indexed. This may simplify the single-language search and eliminate the need for merging results.

In another Solr indexing option, the system indexes all data and all languages in a single Solr field. For this indexing option, the number of Solr index fields remains the same. However, the processing of each field may be handled by a new plug-in. The new plug-in reads the metadata content, decides where the language blocks are, and marks each block with the appropriate locale. A user likely will want to process the query in a complementary manner at search time. In some examples, Rosette software (or any desired alternative) may be used to do the language recognition.

While any of the described Solr indexing options may be used, the first option, one Solr field per locale, has several advantages over the others. This option may have a more streamlined implementation than a multiple core solution. This option may also have less administrative overhead than a multiple core solution. In addition, searching separate languages in distinct fields eliminates the chances of query mismatches. For instance, words from different languages may look similar, but have very different meanings. Having these values in separate fields simplifies querying.

Additional details and examples on media management including searching metadata can be found in U.S. Pat. No. 9,348,890, entitled "SYSTEM AND METHOD OF SEARCH INDEXES USING KEY-VALUE ATTRIBUTES TO SEARCHABLE METADATA," which is fully incorporated by reference herein.

These, and other, aspects of the disclosure and various features and advantageous details thereof are explained more fully with reference to the exemplary, and therefore non-limiting, embodiments illustrated and detailed below. It should be understood, however, that the detailed description and the specific examples, while indicating the some embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive subject matter will become apparent to those skilled in the art from this disclosure.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention.

While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" or is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved using distributed, or networked systems, components and circuits. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc.

Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed is:

1. A method for managing metadata in an enterprise computing network environment, the method comprising:
   receiving, through a user interface adapted to creating or editing metadata of a managed object, an indication that at least one metadata field of the managed object now contains multilingual metadata, the receiving performed by a content management system operating in the enterprise computing network environment, the content management system having a processor, the managed object managed by the content management system;
   responsive to the indication that at least one metadata field of the managed object contains multilingual metadata, creating, by the content management system, a new custom metadata table for the managed object using information, including the at least one metadata field, from an original metadata table for the managed object;
   specifying, through the user interface whether or not each of the fields in the new custom metadata table require multilingual support via the user interface;
   responsive to the indication that the at least one metadata field of the managed object contains multilingual metadata, creating, by the content management system, a locale metadata table, wherein the locale metadata table includes text columns from the original metadata table that are marked as multilingual, and wherein the locale metadata table is a multilingual metadata table ancillary to the new custom metadata table to provide support for multilingual metadata in the new custom metadata table by allowing storage of language variant values for alternative languages;
   receiving, by the content management system through the user interface, at least two metadata field values for the at least one metadata field, wherein the at least two metadata field values representing at least two languages;
   storing, by the content management system, the at least two metadata field values in the new custom metadata table;
   tagging, by the content management system, each of the at least two languages with locale information, the locale information relating to a geographic location;
   storing, by the content management system, the locale information in the locale metadata table in association with the at least one metadata field in the new custom metadata table for the managed object;
   receiving a request from a user for metadata information;
   receiving location information for the user;
   identifying a preferred language for the user, wherein the identification of the preferred language for the user is based on the location information received; and
   responsive to a metadata field description for the metadata information requested by the user containing metadata in the preferred language identified for the user, displaying the metadata in the preferred language, otherwise displaying the metadata in a default language.

2. The method according to claim 1, wherein the new custom metadata table includes a multilingual attribute for the managed object.

3. The method according to claim 2, wherein the multilingual attribute provides an indication of whether the managed object is multilingual-enabled.

4. The method according to claim 3, wherein the indication of the multilingual attribute is selectable by a user through a table editor.

5. The method according to claim 1, further comprising creating separate search indexes for each language variant of the managed object.

6. The method according to claim 5, further comprising:
   providing a search platform for use with the content management system, the search platform comprising searching functions; and
   in response to receiving, through the search platform, a multilingual metadata search query from a user for a managed object containing multilingual metadata, modifying the multilingual metadata search query to make the multilingual metadata search query compatible with the provided search platform.

7. The method according to claim 6, wherein modifying the multilingual metadata search query includes mapping multilingual metadata fields to fields that are compatible with the provided search platform.

8. A system, comprising:
   a processor;
   a non-transitory computer readable medium storing instructions translatable by the processor, the instructions when translated by the processor perform, in an enterprise computing network environment:
   receiving, through a user interface adapted to creating or editing metadata of a managed object, an indication that at least one metadata field of the managed object now contains multilingual metadata, the managed object managed by the system;
   responsive to the indication that at least one metadata field of the managed object contains multilingual metadata, creating a new custom metadata table for the managed object using information, including the at least one metadata field, from an original metadata table for the managed object;
specifying, through the user interface whether or not each of the fields in the new custom metadata table require multilingual support via the user interface;
responsive to the indication that the at least one metadata field of the managed object contains multilingual metadata, creating, by the content management system, a locale metadata table, wherein the locale metadata table includes text columns from the original metadata table that are marked as multilingual, and wherein the locale metadata table is a multilingual metadata table ancillary to the new custom metadata table to provide support for multilingual metadata in the new custom metadata table by allowing storage of language variant values for alternative languages;
receiving at least two metadata field values for the at least one metadata field, wherein the at least two metadata field values representing at least two languages;
storing, by the content management system, the at least two metadata field values in the new custom metadata table;
tagging each of the at least two languages with locale information, the locale information relating to a geographic location;
storing the locale information in the locale metadata table in association with the at least one metadata field in the new custom metadata table for the managed object;
receiving a request from a user for metadata information;
receiving location information for the user;
identifying a preferred language for the user, wherein the identification of the preferred language for the user is based on the location information received; and
responsive to a metadata field description for the metadata information requested by the user containing metadata in the preferred language identified for the user, displaying the metadata in the preferred language, otherwise displaying the metadata in a default language.

9. The system according to claim 8, wherein the new custom metadata table includes a user-selectable multilingual attribute for the managed object, the user-selectable multilingual attribute providing an indication of whether the managed object is multilingual-enabled.

10. The system according to claim 8, wherein the instructions are further translatable by the processor to perform:
creating separate search indexes for each language variant of the managed object.

11. The system according to claim 10, wherein the instructions are further translatable by the processor to perform:
providing a search platform for use with the content management system, the search platform comprising searching functions; and
in response to receiving, through the search platform, a multilingual metadata search query from a user for a managed object containing multilingual metadata, modifying the multilingual metadata search query to make the multilingual metadata search query compatible with the provided search platform.

12. A computer program product comprising a non-transitory computer readable medium storing instructions translatable by a processor, the instructions when translated by the processor perform, in an enterprise computing network environment:
receiving, through a user interface adapted to creating or editing metadata of a managed object, an indication that at least one metadata field of the managed object now contains multilingual metadata;
responsive to the indication that at least one metadata field of the managed object contains multilingual metadata, creating a new custom metadata table for the managed object using information, including the at least one metadata field, from an original metadata table for the managed object;
specifying, through the user interface whether or not each of the fields in the new custom metadata table require multilingual support via the user interface;
responsive to the indication that the at least one metadata field of the managed object contains multilingual metadata, creating, by the content management system, a locale metadata table, wherein the locale metadata table includes text columns from the original metadata table that are marked as multilingual, and wherein the locale metadata table is a multilingual metadata table ancillary to the new custom metadata table to provide support for multilingual metadata in the new custom metadata table by allowing storage of language variant values for alternative languages;
receiving at least two metadata field values for the at least one metadata field, wherein the at least two metadata field values representing at least two languages;
storing, by the content management system, the at least two metadata field values in the new custom metadata table;
tagging each of the at least two languages with locale information, the locale information relating to a geographic location;
storing the locale information in the locale metadata table in association with the at least one metadata field in the new custom metadata table for the managed object;
receiving a request from a user for metadata information;
receiving location information for the user;
identifying a preferred language for the user, wherein the identification of the preferred language for the user is based on the location information received; and
responsive to a metadata field description for the metadata information requested by the user containing metadata in the preferred language identified for the user, displaying the metadata in the preferred language, otherwise displaying the metadata in a default language.

13. The computer program product according to claim 12, wherein the new custom metadata table includes a user-selectable multilingual attribute for the managed object, the user-selectable multilingual attribute providing an indication of whether the managed object is multilingual-enabled.

14. The computer program product according to claim 12, wherein the instructions are further translatable by the processor to perform:
creating separate search indexes for each language variant of the managed object.

* * * * *